(12) United States Patent
De'Longhi

(10) Patent No.: US 8,056,468 B2
(45) Date of Patent: Nov. 15, 2011

(54) APPARATUS FOR PRODUCING A COFFEE BEVERAGE AND METHOD OF FILLING THE RECEPTACLE OF SAID APPARATUS

(75) Inventor: Giuseppe De'Longhi, Treviso (IT)

(73) Assignee: De'Longhi S.p.A., Treviso (IT)

( * ) Notice: Subject to any disclaimer, the term of this patent is extended or adjusted under 35 U.S.C. 154(b) by 299 days.

(21) Appl. No.: 12/373,596

(22) PCT Filed: Jul. 11, 2007

(86) PCT No.: PCT/EP2007/006128
§ 371 (c)(1),
(2), (4) Date: Jan. 13, 2009

(87) PCT Pub. No.: WO2008/006556
PCT Pub. Date: Jan. 17, 2008

(65) Prior Publication Data
US 2010/0068362 A1    Mar. 18, 2010

(30) Foreign Application Priority Data

Jul. 14, 2006 (IT) .............................. MI2006A1376

(51) Int. Cl.
*A47J 31/06* (2006.01)
*B65B 1/04* (2006.01)

(52) U.S. Cl. ......... 99/285; 99/289 R; 99/289 P; 141/95; 141/198; 141/351

(58) Field of Classification Search .................... 141/83, 141/94, 95, 98, 192, 198, 351; 99/280, 285, 99/289 R, 289 P, 300
See application file for complete search history.

(56) References Cited

U.S. PATENT DOCUMENTS

| | | | | |
|---|---|---|---|---|
| 4,872,402 A * | 10/1989 | Johnson et al. | ................. | 99/280 |
| 5,094,153 A * | 3/1992 | Helbling | ......................... | 99/280 |
| 5,158,793 A * | 10/1992 | Helbling | ....................... | 426/231 |
| 5,503,060 A * | 4/1996 | Morecroft et al. | ............. | 99/295 |
| 5,676,041 A * | 10/1997 | Glucksman et al. | ............ | 99/286 |
| 5,699,719 A * | 12/1997 | Lucas et al. | .................... | 99/299 |
| 5,957,034 A * | 9/1999 | Sham et al. | .................... | 99/285 |
| 6,279,459 B1 * | 8/2001 | Mork et al. | .................... | 99/281 |
| 7,201,098 B2 * | 4/2007 | Wang | .............................. | 99/286 |

OTHER PUBLICATIONS

Notification of First Office Action, Chinese Application 200780024070.9, Jul. 26, 2010.

* cited by examiner

*Primary Examiner* — Timothy L Maust
(74) *Attorney, Agent, or Firm* — Whiteford, Taylor & Preston LLP; Joseph L. Morales; Jeffrey C. Maynard

(57) ABSTRACT

The apparatus for producing a coffee beverage comprises an automatic coffee machine and a receptacle that can be docked with the beverage spigot of the machine in filling position, the receptacle having a mechanism that is detectable by a sensor mechanism in the machine when the receptacle attains the filling position, the sensor mechanism being in communication with the control unit of the coffee machine in such a way that, when it detects the detectable mechanism, it automatically sends the control unit a signal to switch the coffee machine to an operating mode that consecutively executes one or more operating cycles for filling of the receptacle.

12 Claims, 6 Drawing Sheets

APPARATUS FOR PRODUCING A COFFEE BEVERAGE AND METHOD OF FILLING THE RECEPTACLE OF SAID APPARATUS

The present invention refers to an apparatus for producing a coffee beverage and a method of filling the receptacle of said apparatus.

It is known that traditional automatic coffee machines are used to produce a considerable quantity of coffee beverage which is necessary to fill a thermal receptacle for the subsequent apportioned consumption of the beverage.

In this scenario the user programs an operation cycle, and at the end of execution of the operation cycle the user programs a further operation cycle and so on, until the desired amount of beverage has been obtained.

It is clear that this process requires time which is not always available to the user, as well as requiring continual attention and checking and also a certain facility for manipulation for the entire time that the coffee machine is operating.

The technical purpose that the present invention offers is, therefore, that of implementing an apparatus for producing a coffee beverage and a method of filling the receptacle of said apparatus which together eliminate the inconvenient tasks reported in the state of the art.

Within this technical purpose, one objective of the invention is to implement an apparatus for producing a coffee beverage and a method of filling the receptacle of said apparatus which together result in the automated filling of the receptacle to the desired level, without needing to keep the user occupied for the entire time the coffee machine is operating, and without requiring any special care or attention or facility on the part of the user.

Another objective of the invention is to implement an apparatus for producing a coffee beverage and a method of filling the receptacle of said apparatus which together are safe and reliable.

The technical purpose, in addition to these and other objectives, according to the present invention are achieved by implementing an apparatus for producing a coffee beverage which conforms to claim 1, and a method of filling the receptacle of said apparatus which conforms to claim 16.

Other characteristics of the present invention are also defined in the subsequent claims.

Further characteristics and advantages of the invention will be more evident from the description of a form of execution, which is preferred but not exclusive, of the apparatus for producing a coffee beverage according to the invention, illustrated by way of example and not limitation in the enclosed drawings, in which.

Figure 4:
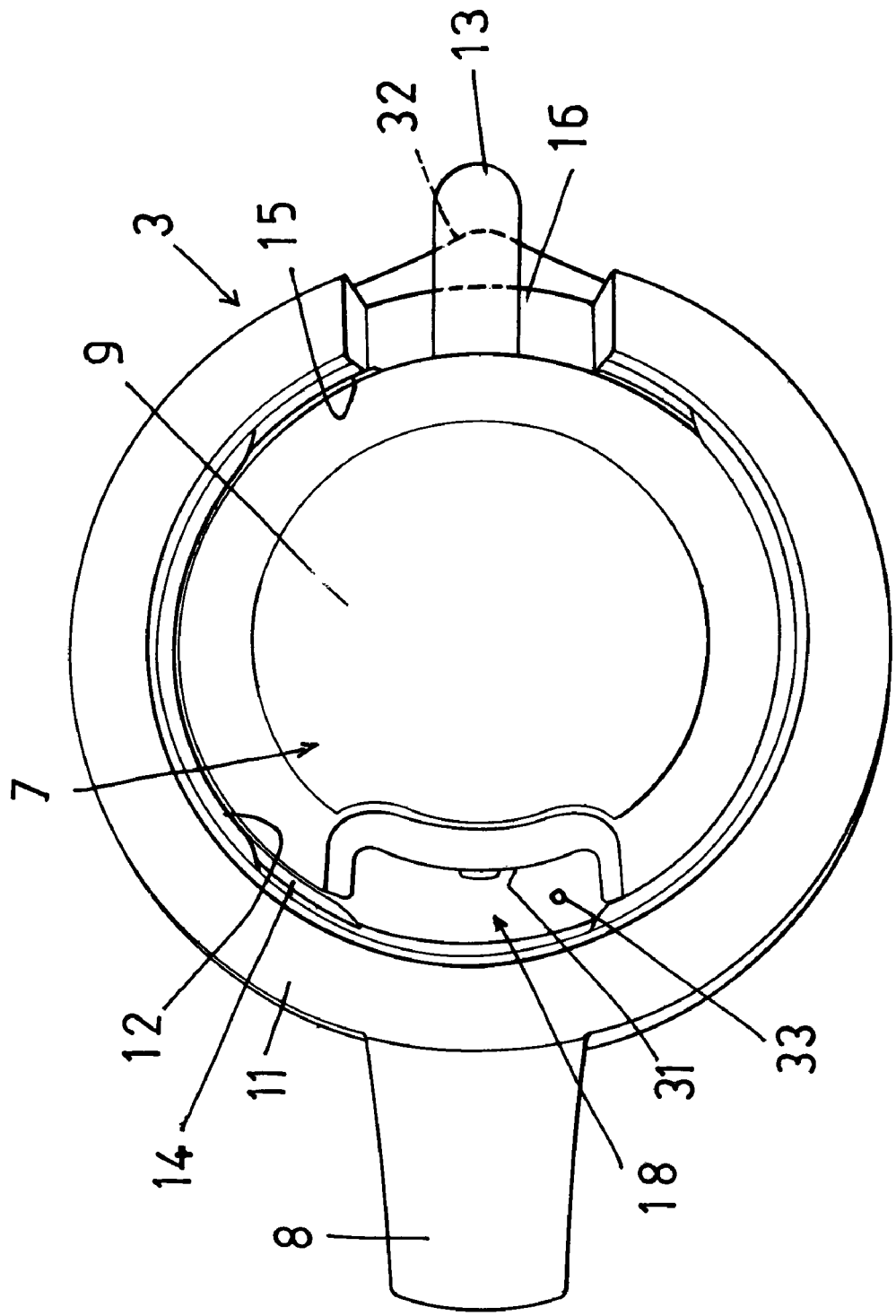
FIG. 4 is a plan view of the receptacle of any of the implementations of the invention illustrated in the previous figures, in which the lid is in the position that prevents the attainment of the filling position.
Figure 5:
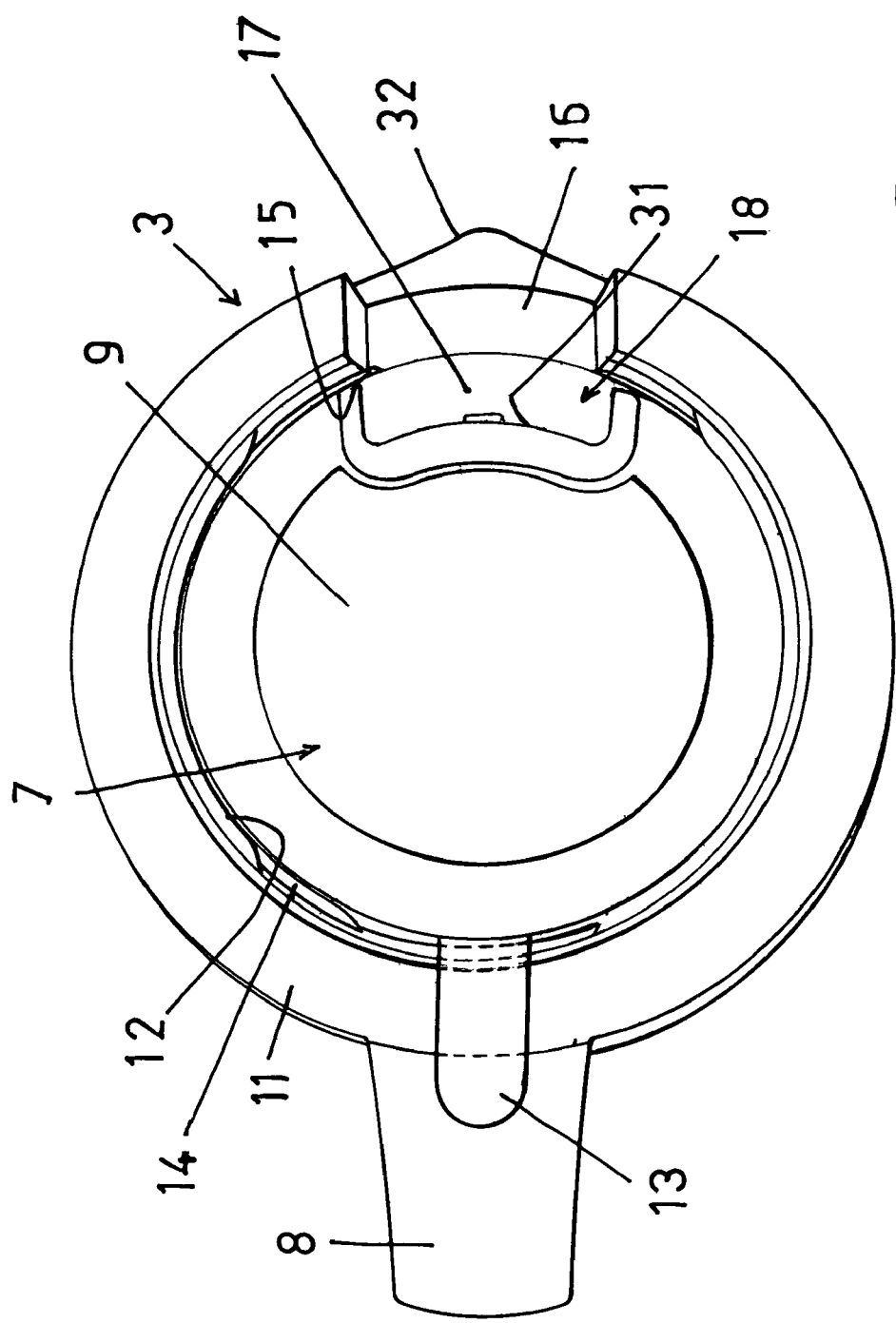
Figure 6:
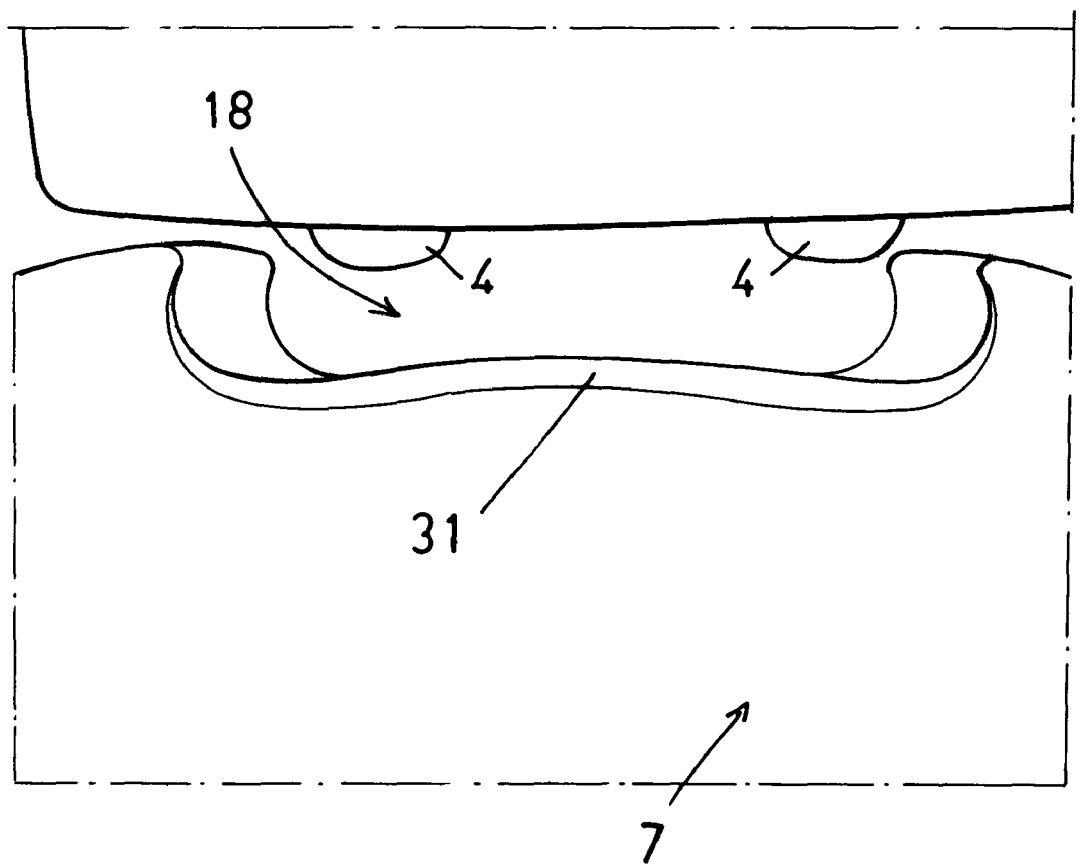

FIG. 5 is a plan view of the receptacle in FIG. 4, in which the lid is in the position that allows the attainment of the filling position, and FIG. 6 is an enlarged detailed view of the coupling area between the receptacle lid and the beverage supply spigot of the machine in any of the implementations of the invention illustrated in the previous figures, With reference to the cited figures, an apparatus is shown for producing a coffee beverage and this apparatus is referred to in general with the reference number 1.

Apparatus 1 comprises an automatic coffee machine 2 and a receptacle 3, preferably in thermally insulating material, which can be placed in position for filling from the beverage spigot 4 of the coffee machine 2.

The receptacle 3 has detectable parts and the coffee machine has a sensor mechanism suitable for detecting the detectable parts when the receptacle 3 attains the correct filling position.

Preferably, the sensor mechanism comprises a reed sensor 5 and the detectable parts comprise a permanent magnet 6 affixed to the upper part and on the lateral surface of the receptacle 3.

The detection of the correct positioning of the receptacle 3 can also be implemented by other systems, for example the sensor mechanism could comprise a capacitive sensor or an RFID reader and the detectable parts could comprise, respectively, a suitable mechanical organ or a transponder.

Advantageously the sensor mechanism is in communication with the control unit (not shown) of the coffee machine 2 in such a way that, when it detects the detectable parts, it automatically sends a signal to the control unit which switches the coffee machine 2 to an operating mode that consecutively executes a number of operation cycles to fill the receptacle 3.

For this purpose the push-button panel 22 of the coffee machine 2 has a button 30 to program the number of consecutive operation cycles of the coffee machine.

Figure 1:
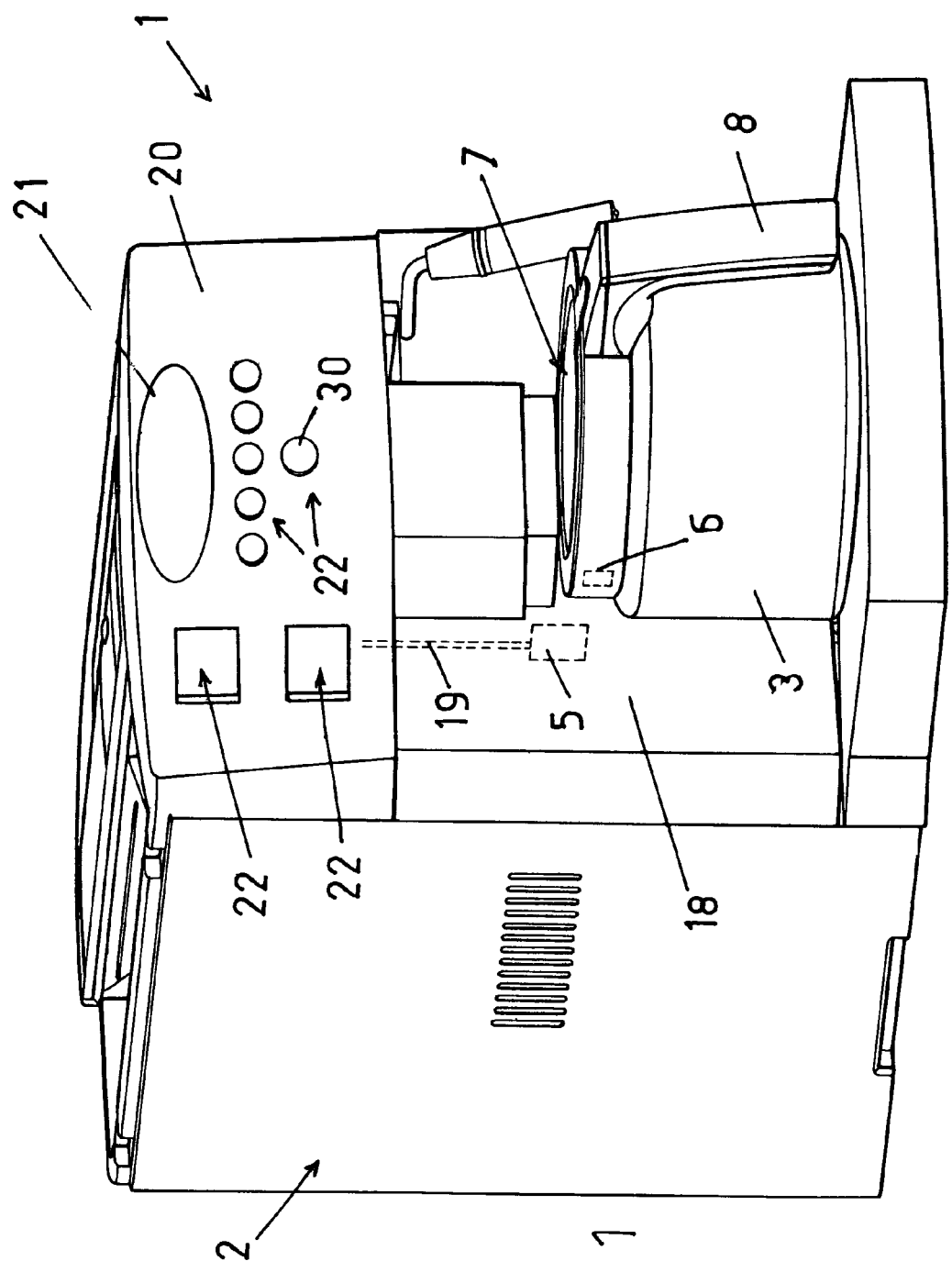
FIG. 1 shows a perspective view of an apparatus that conforms to a first preferred means of implementing the invention, in which the receptacle is in position to be filled.

In the implementation shown in FIG. 1 the reed sensor 5 is affixed to the inspection panel 18 of the coffee machine 2 and is connected by electrical wires 19 to the control unit of the coffee machine.

Figure 2:
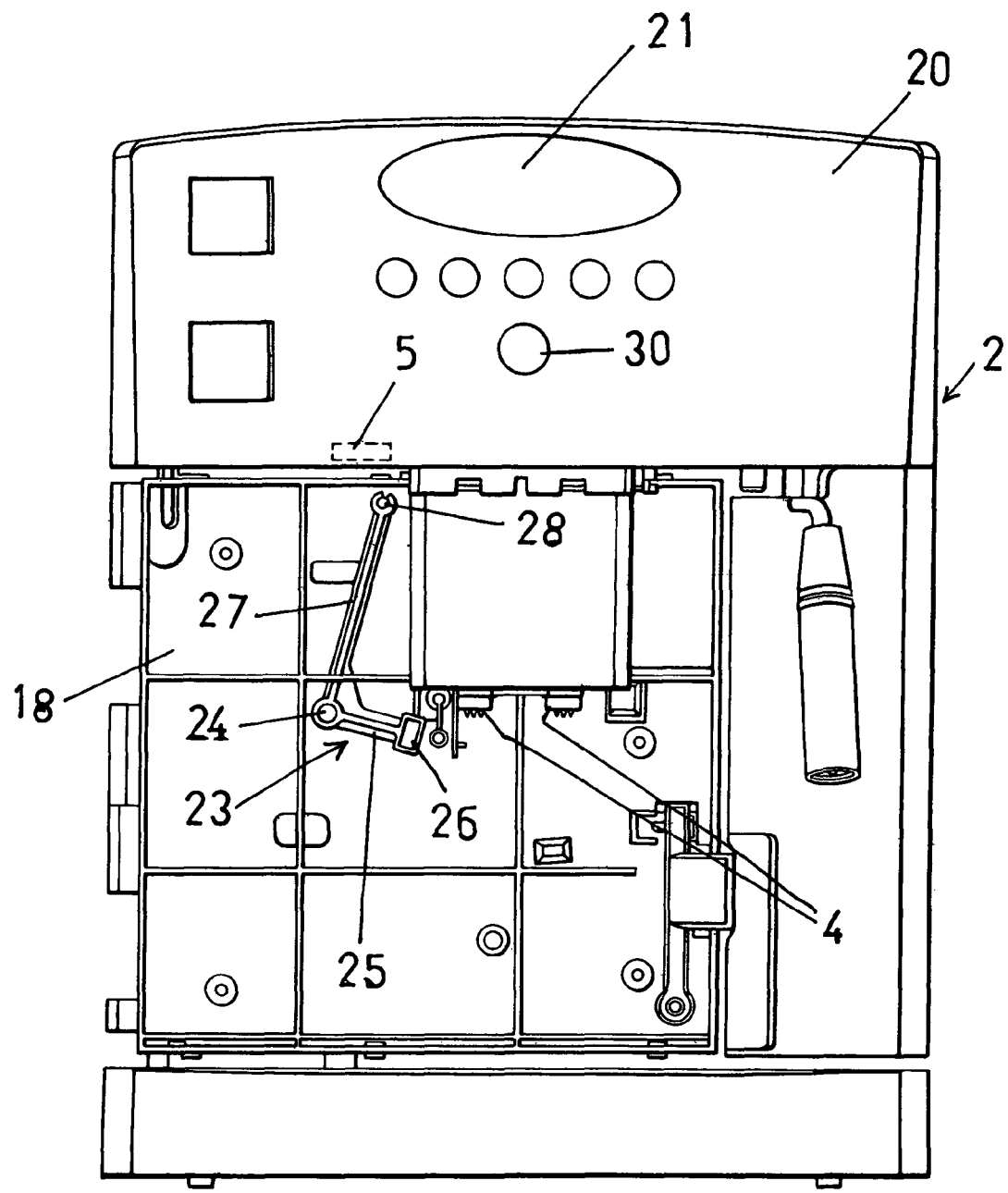
FIG. 2 shows an elevation view of an apparatus that conforms to a second preferred means of implementing the invention, before placing the receptacle in the coffee machine.
Figure 3:
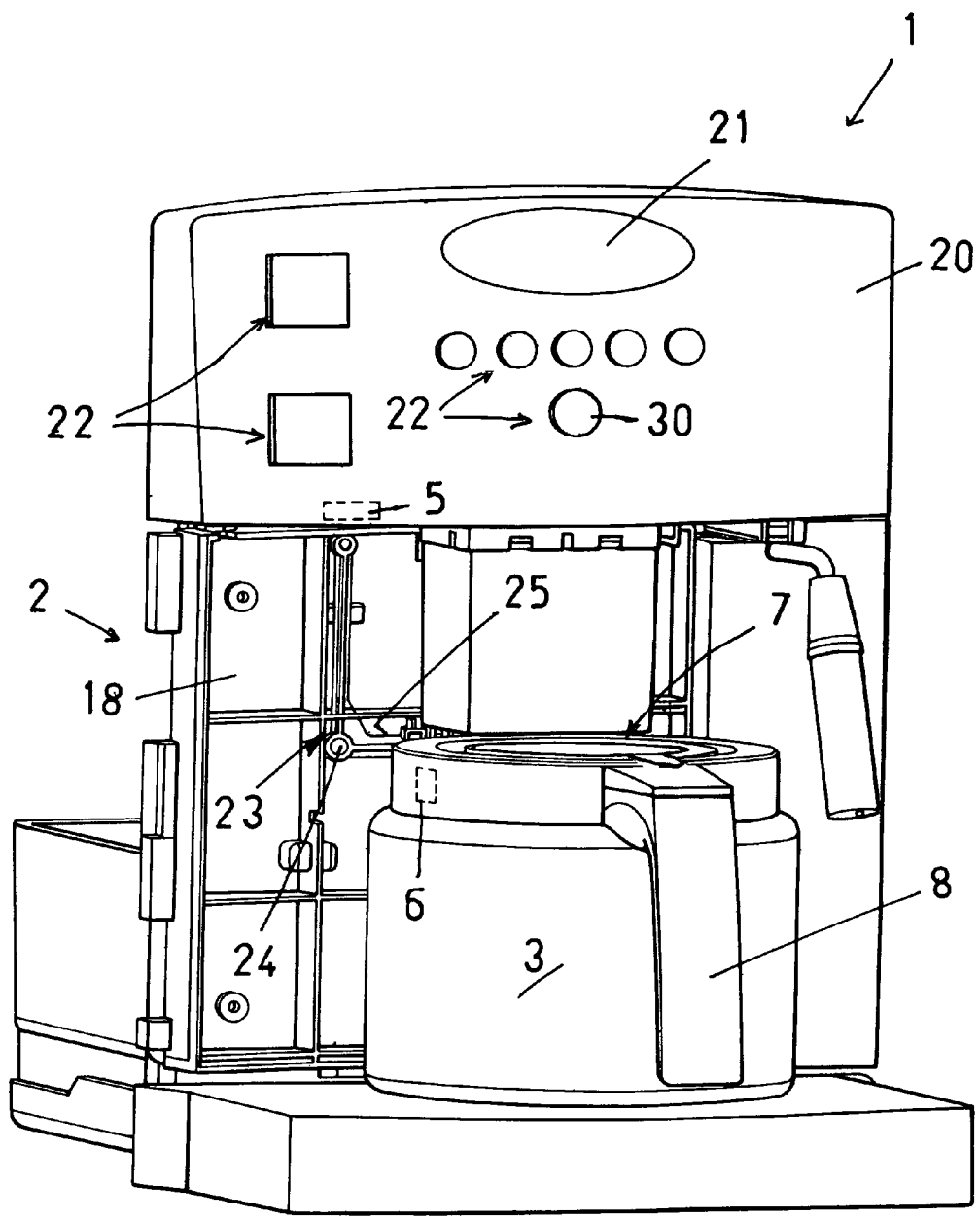
FIG. 3 shows a perspective view of the apparatus in FIG. 2, in which the receptacle is in position to be filled.

In the implementation shown in FIGS. 2 and 3, however, the reed sensor 5 is affixed to the fascia 20 of the coffee machine 2, where the display 21 and the push-button panel 22 of the coffee machine 2 are present.

In this case there is a transmission lever 23 with fulcrum at 24 on the inspection panel 18 of the coffee machine.

The transmission lever 23 has a first lever arm 25 that has a second permanent magnet 26 suitable for interacting with the permanent magnet 6 when in a first angular position of the transmission lever 23 (FIG. 2), and a second lever arm 27 with a third permanent magnet 28 suitable for interacting with the reed sensor when the transmission lever 23 is moved to a second angular position (FIG. 3) as a consequence of the magnetic interaction between the permanent magnet 6 and the second permanent magnet 26.

In this case the electrical connection wires between the reed sensor 5 and the coffee machine control unit 2 do not move during the opening/closing of the inspection panel 18 and can be kept integral on a long term basis.

The receptacle 3 has a handle 8, a spout 32 for pouring out the contents, and a lid 7 fitted in its turn with a pad 9.

The lid 7 can be rotated in its circular depression in the top surface of the receptacle 3.

Specifically, the top surface of the receptacle 3 is shaped with a ringed perimeter lip 11, suitable for containing the lateral movement of the lid 7 and guiding it in its rotation around the central axis 13 of the lid 7.

From the lip 11 an upper retaining blade 12 and a lower retaining blade 14 extend radially towards the inside of the receptacle 3, and between these a perimeter blade 15 of the lid 7 is held and can slide, to prevent the removal of the lid from the receptacle 3.

The lip 11 has an interruption 16 corresponding to the area where it meets the spigot 4.

The receptacle 3 also has a slide 17, just below the lid 7 in the area where it meets the spigot 4, for the beverage entering the receptacle 3.

In accordance with one aspect of the invention the correct filling position of the receptacle 3 corresponds to an area within the lid 7.

Advantageously the lid 7 has a mechanism 18 that allows attainment of the correct filling position.

Specifically the position attainment mechanism 18 comprises a recess 31 in the perimeter edge of the lid 7 into which the spigot 4 can be positioned.

Advantageously when the orientation of the lid 7 is at the correct filling position there is an open passage for the beverage from outside to inside the receptacle 3 (and vice versa) via the recess 31, and in every other orientation of the lid 7 this passage is closed in such a way as to limit the dispersal of heat from the receptacle 3.

There is a closing flange 33 in the recess 31, which runs along the internal perimeter of the top surface of the receptacle 3 and causes the recess 31 to close when the latter is not aligned with the slide 17.

The method of filling the receptacle 3 is briefly as follows.

The user pushes down the pad 9 and by acting on it rotates the lid 7 until the recess 31 is aligned with the interruption 16 in the lip 11.

In this position the recess 31 overlays the slide 17 and the passage leading to the inside of the receptacle 3 is open.

The user moves the receptacle 3 to insert the spigot 4 into the recess 31 with the established orientation of the lid 7 to allow this insertion.

Any other orientation of the lid 7 will not allow the insertion of the spigot 4 into the recess 31.

Only when the spigot 4 is inserted in the recess 31 will the permanent magnet 6 be within the range of the reed sensor 5 which can thus detect it and consequently signal the presence of the receptacle 3 in the correct filling position to the control unit of the coffee machine 2.

In a filling position that is not correct, the spigot 4 will instead come up against the circumferential perimeter of the lid 7 and stop, keeping the permanent magnet 6 outside the range of the reed sensor 5.

When the control unit of the coffee machine 2 ascertains the presence of the receptacle 3 in the correct filling position, it automatically initiates two procedures: firstly it displays a series of interrogation messages on the display 21, including messages to check that there is water in the water reservoir of the coffee machine 2 and/or to check for the presence of used grounds in the coffee ground collection drawer of the coffee machine 2 and/or to check for the presence of coffee beans in the coffee bean funnel of the coffee machine 2; secondly it switches the coffee machine 2 to an operating mode that will consecutively execute a number of operation cycles.

The user at this point performs the checks indicated in the interrogation messages that were previously displayed and then programs the number of operation cycles depending on how much the receptacle is to be filled.

Each press of the programming button 30 after the first press corresponds to an incremental request of one dose (single or double) of beverage.

For example, a single press will fill the receptacle 3 with one dose, two consecutive presses means two doses, three consecutive presses means three doses, and so on.

When filling of the receptacle 3 is complete, by removing the receptacle 3 from the filling position the permanent magnet 6 leaves the range of the reed sensor 5 so that a signal is sent to the control unit of the coffee machine 2 to switch it back into the traditional operating mode.

The apparatus conforming to the present invention has intrinsic safety features in that the continuous operating mode is activated only if the receptacle is in the correct filling position.

Filling of the receptacle is done in a simple and automatic way without the user needing to have any special abilities or dexterity.

The invention also detects a receptacle consisting of a cup or mug for coffee, tea, cappuccino, hot chocolate and other beverages, if it has a unidirectional or bidirectional system of communicating with a coffee machine.

The communication system has a means of attributing a specific identity to the cup or mug. The attributed identity can be recognised by the coffee machine in such a way as to put it into operation with a specific operating program to produce a specific beverage associated with the specific identity of the mug or cup recognised by the coffee machine.

The means of attributing identity comprises a generator of electrical, magnetic or electromagnetic signals containing an identification code of the cup or mug and which can be detected by a suitable detector connected to the control unit of the coffee machine.

Once the identity of the cup or mug has been detected, the control unit programs the coffee machine with the specific program associated with the detected identity. In this way the cups or mugs can be customised in that they are able to automatically order the production of their owner's preferred beverage (e.g. cappuccino, macchiato, long coffee, strong coffee etc.) from the coffee machine.

The identification code can be reprogrammed in the event that the owner of the cup or mug changes or wishes to change their favourite beverage.

The reprogramming can be done directly by means of the coffee machine, if the communication system is bidirectional.

The cup or mug can have the signal generator embedded in its body, for example in its base, and the sensor can be built into the plate where the cup or mug is placed for filling. In this case, the plate may bear an indication for correct positioning of the cup or mug (for example a graphic sign) or a centring element that ensures the cup or mug is placed in the correct position (for example a depression or relief on the plate in which the cup or mug is to be placed).

The apparatus for producing a coffee beverage thus conceived may be subject to numerous modifications and variants, all of which fall within the scope of the inventive concept; in addition all the details may be replaced by elements that are technically equivalent.

In practice the materials used may be of any type, and the dimensions as well, in accordance with the requirements and with the state of the art.

The invention claimed is:

1. An apparatus for producing a coffee beverage characterized by the fact that it comprises an automatic coffee machine and a receptacle that can be docked with a beverage spigot of said machine in a filling position, said receptacle presenting mechanisms that are detectable by sensor mechanisms of said machine when said receptacle attains said filling position, said sensor mechanisms being in communication with a control unit of said coffee machine in such a way that, when said sensor mechanisms detect said detectable mechanisms, said sensor mechanisms automatically send said control unit a signal to switch said coffee machine to an operating mode that consecutively executes one or more operation cycles to fill said receptacle; wherein said receptacle has a lid comprising a recess in the perimeter edge of said lid in which said spigot can be positioned.

2. The apparatus according to claim 1, characterized by the fact that said sensor mechanisms comprise a reed sensor and said detectable mechanisms comprise a permanent magnet.

3. The apparatus according to claim 1, characterized by the fact that said sensor mechanisms comprise a capacitive sensor.

4. The apparatus according to claim 1, characterized by the fact that said sensor mechanisms comprise an RFID sensor.

5. The apparatus according to claim 1, characterized by the fact that said filling position corresponds to an internal area of said lid.

6. The apparatus according to claim 1, characterized by the fact that said lid can be rotated within its own circular depression made in a top portion of said receptacle.

7. The apparatus according to claim 1, characterized by the fact that said machine has a display connected to said control unit for displaying interrogation messages upon attainment of said filling position, said interrogation messages including verification of water in a water reservoir of said coffee machine and/or verification of used grounds in a coffee ground collection drawer of said coffee machine and/or verification of coffee beans in a coffee bean funnel of said coffee machine.

8. The apparatus according to claim 2, characterized by the fact that said reed sensor is fixed to an inspection panel of said coffee machine.

9. The apparatus according to claim 2, characterized by the fact that said permanent magnet is affixed to an upper part and on a lateral side of said receptacle.

10. The apparatus according to claim 2, characterized by the fact that said reed sensor is affixed to a fascia of said coffee machine.

11. The apparatus according to claim 2, characterized by the fact that said machine has a transmission lever with a fulcrum attached to an inspection panel of said coffee machine, said transmission lever having a first lever arm having a second permanent magnet suitable for interacting with said permanent magnet when in a first angular position of said transmission lever, and a second lever arm having a third permanent magnet suitable for interacting with said reed sensor when said lever is moved to a second angular position as a consequence of the interaction between said magnet and said second magnet.

12. The apparatus according to claim 1, characterized by the fact that said receptacle is in a thermally insulating material.

* * * * *